E. F. STANSBERRY.
HAYRAKE.
APPLICATION FILED JAN. 26, 1920.

1,406,506.

Patented Feb. 14, 1922.
3 SHEETS—SHEET 1.

WITNESSES

INVENTOR
E. F. STANSBERRY,
BY
ATTORNEYS

E. F. STANSBERRY.
HAYRAKE.
APPLICATION FILED JAN. 26, 1920.
1,406,506.
Patented Feb. 14, 1922.
3 SHEETS—SHEET 2.
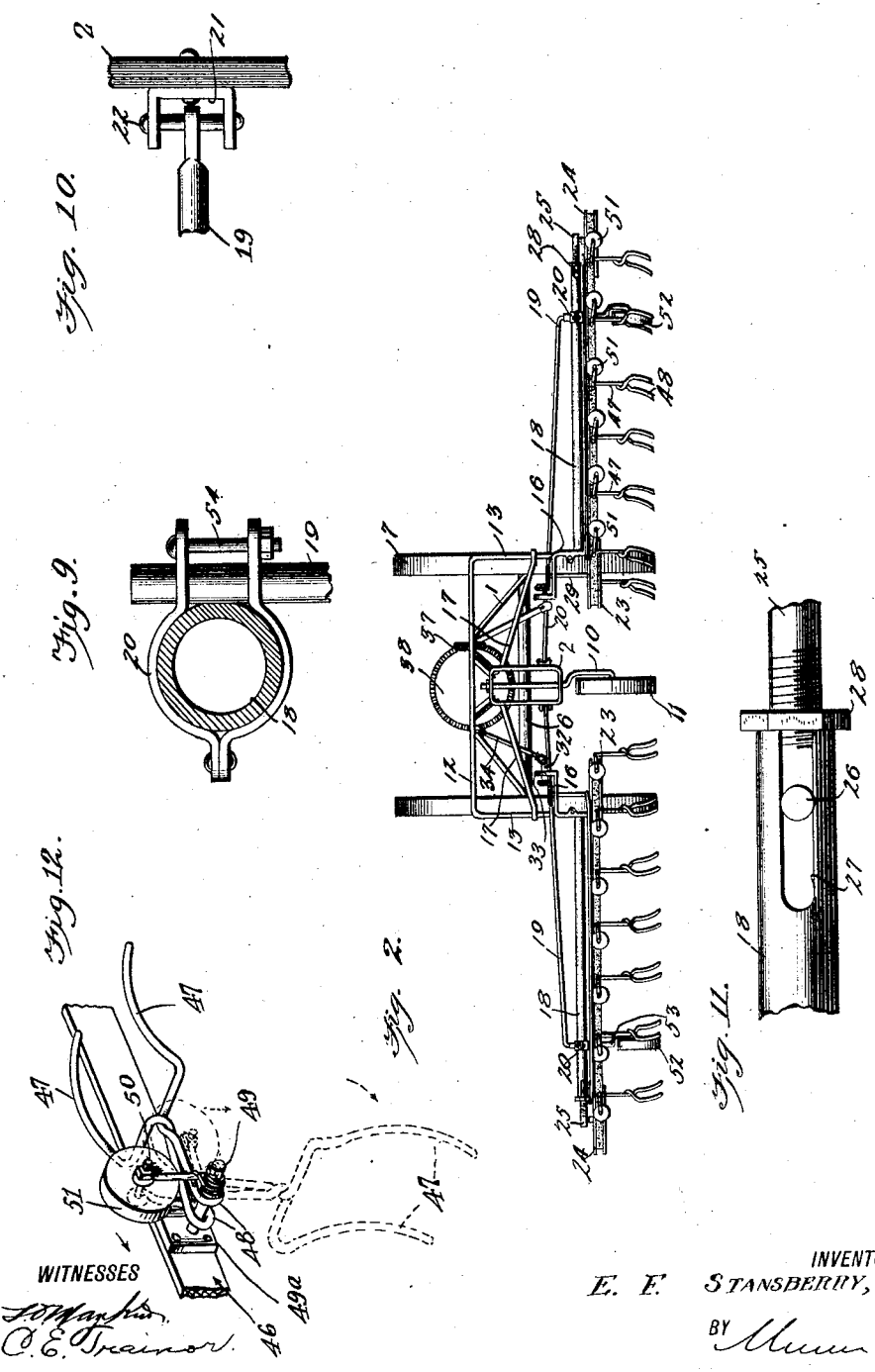
WITNESSES
INVENTOR
E. F. STANSBERRY,
BY
ATTORNEYS

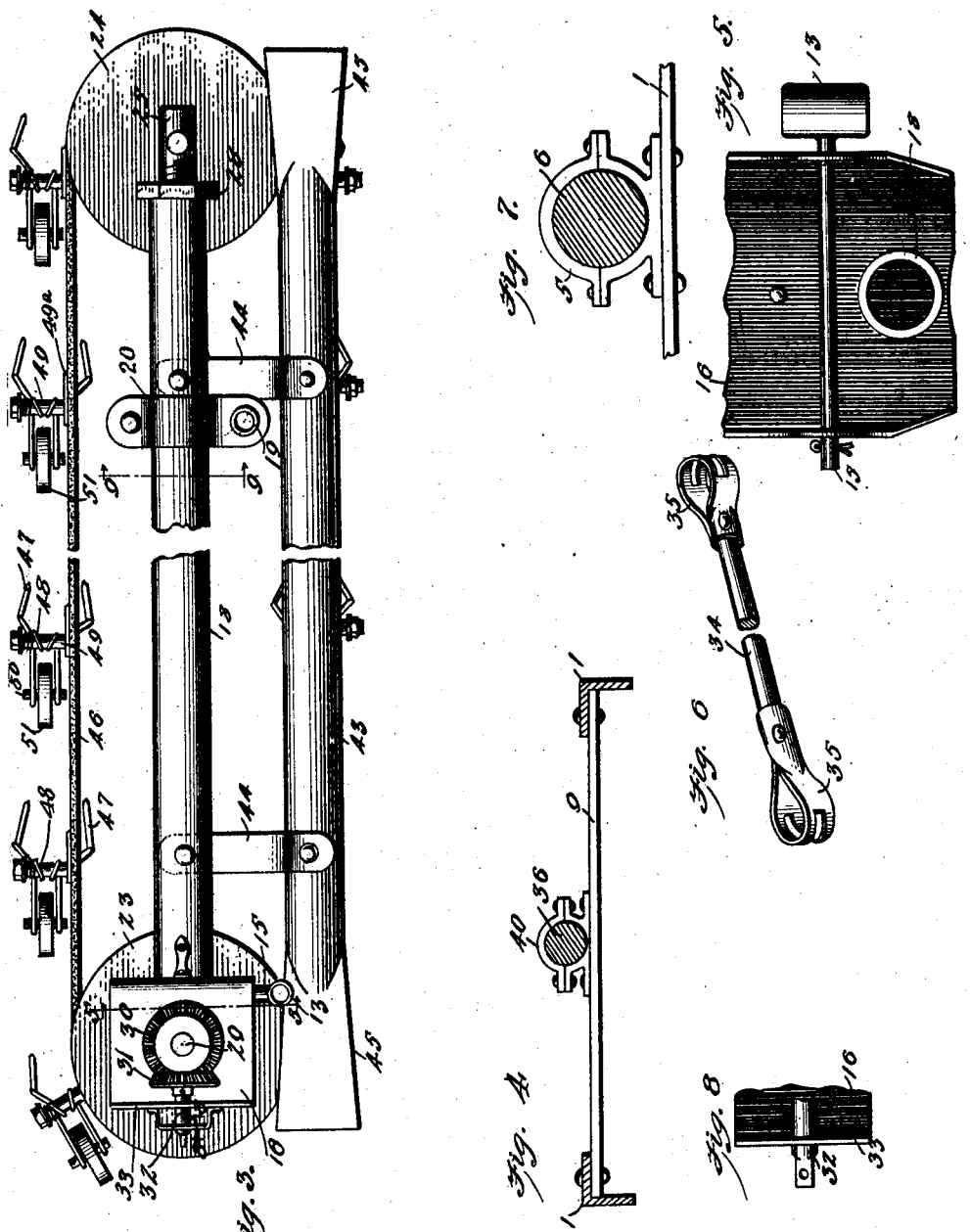

UNITED STATES PATENT OFFICE.

EVERETT FRANKLIN STANSBERRY, OF MORAVIA, IOWA.

HAYRAKE.

1,406,506.  Specification of Letters Patent. Patented Feb. 14, 1922.

Application filed January 26, 1920. Serial No. 354,045.

*To all whom it may concern:*

Be it known that I, EVERETT FRANKLIN STANSBERRY, a citizen of the United States, and a resident of Moravia, in the county of Appanoose and State of Iowa, have invented certain new and useful Improvements in Hayrakes, of which the following is a specification.

My invention is an improvement in hay rakes, and has for its object to provide a device of the character specified, for raking into a windrow a wide swathe, wherein laterally extending moving mechanism for the hay is supported by a central frame, the moving mechanism moving the hay inward toward the center from each side.

In the drawings:

Figure 2 is a front view,

Figure 3 is an enlarged detail showing one of the conveying mechanisms,

Figure 4 is a section on the line 4—4 of Figure 1,

Figure 5 is a section on the line 5—5 of Figure 3,

Figure 6 is a perspective view of the transmission shaft,

Figure 7 is a section on the line 7—7 of Figure 1,

Figure 1:
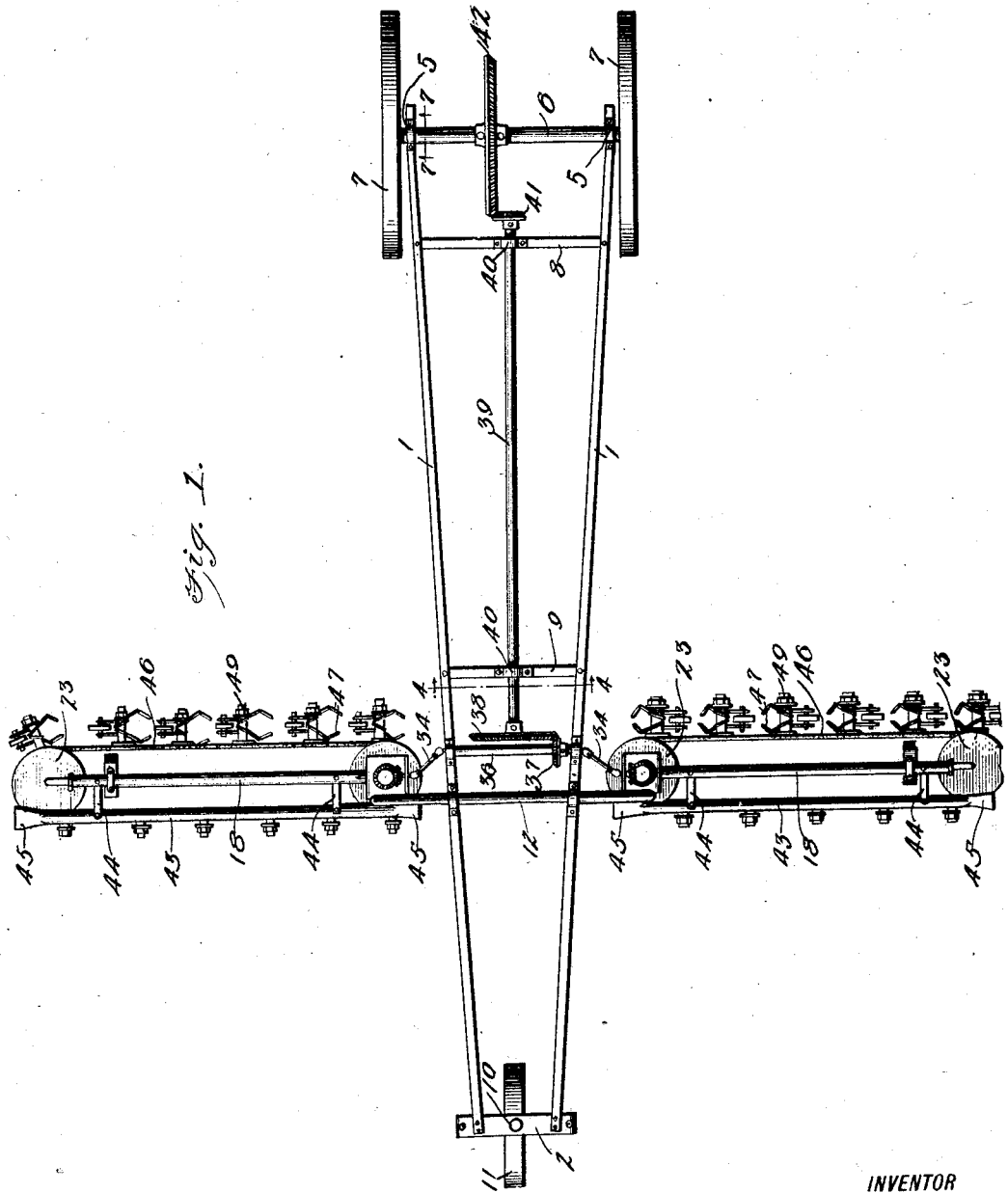
Figure 1 is a top plan view of the improved rake.

Figures 8 and 9 are sections on the lines 8—8 and 9—9, respectively of Figure 3, Figure 10 is a detail of the connection between the steering wheel frame and the support for the outer ends of the hay moving mechanism, Figure 11 is a partial top plan view showing the adjustment for the outer ends of the hay moving mechanism.

Fig. 12 is an enlarged fragmentary perspective view of the teeth and their attachments.

In the present embodiment of the invention, a suitable frame is provided consisting in the present instance of longitudinally extending bars 1, which are connected with a substantially rectangular frame 2 at their forward ends, and which have bearings 5 at their rear ends in which is journaled a rear axle 6, the said axle carrying wheels 7. The bars 1 are connected by cross bars 8 and 9 intermediate their ends, and the frame 2 has journaled vertically therein a shaft 10, which carries at its lower end a steering wheel 11 for the rake.

A yoke comprising a body 12 and depending arms 13 is arranged transversely of the frame, just in front of the cross bar 9, and this yoke supports the mechanism for moving the hay inward to form the central windrow. Each of these arms 13 at its lower end has a rearward extension 15, with which is connected the vertical portion of an angular plate 16.

As shown more particularly in Figure 5, the depending portion of the plate is flanged at its sides, and the extension passes through the flanges, and is engaged by a cotter pin on the opposite side of the flange from the arm. The arms of the yoke are braced against the frame 2 by means of links or braces 17, which incline downwardly and outwardly from the frame to the arm. Each of the angle plates 16 has extending outwardly through the vertical portion thereof a pipe or shaft 18, and these pipes or shafts are connected near their outer ends to the frame 2 near its lower end, by means of links 19.

Each of these links 19 has at its outer end a bearing 20 which engages the adjacent pipe or shaft 18, and the inner end of each link is received between the vertically spaced arms of a U-shaped member 21, Figure 10, secured to the adjacent side of the frame 2, and the link is pivoted to the arms by a rivet 22. Each pipe 18 supports a pair of pulleys 23 and 24, the pulleys 23 being at the inner end of the pipe while the pulleys 24 are at the outer ends.

Each of the pulleys 24 is journaled on a pin depending from a stem 25 which engages within the outer end of the pipe 18, and each stem has a lateral pin 26 moving in a slot 27 extending longitudinally of the pipe. A nut 25 is threaded onto the stem and bears against the end of the pipe. The stem 28 and the pipe 18 constitute telescoping members which are adjusted by means of the nut. The inner pulley 23 of each bar is secured to a shaft 29 journaled in the horizontal portion of the adjacent plate 16, and each shaft 29 carries at its upper end bevel gear wheels 30.

Each of these gear wheels meshes with a bevel gear wheel 31 on a stub shaft 32, which is journaled in an upstanding flange 33 at the inner end of the adjacent angle plate 16. Each of these stub shafts 32 is connected by a universal joint with a transmission shaft 34. Each of these transmission shafts as shown in Figure 6, comprises a central portion having at each end universal joint sections 35 which cooperate with similar sections on the stub shafts.

At their inner ends these shafts 34 have the universal joint connection with a driven shaft 36 journaled transversely of the frame 1. A bevel pinion 37 is secured to the shaft 36 between the frame members 1 and this pinion meshes with a bevel gear 38 on the forward end of a shaft 39 which is journaled in bearings 40 on the cross bars 8 and 9 before mentioned.

At its rear end the shaft 39 has a pinion 41 which meshes with a bevel gear wheel 42 on the axle 6. Thus the pulleys 23 are driven from the rear axle, through the shafts 39, 36 and 34.

The pipes 18 are connected near their ends to guide plates 43, by means of clips 44. Each of these guide plates has its ends widened as indicated at 45, and bent slightly upward as shown and each plate forms a guide for the forward run of a belt 46 supported by the adjacent pair of pulleys, and these belts carry the hay moving mechanism, which on the forward run of the belt moves the hay inwardly to form a central windrow.

The said mechanism comprises series of pairs of teeth. Each of these teeth 47 has a coil 48 intermediate its ends, which engages over a pin or shaft 49 extending laterally from the adjacent belt. The teeth extend above and below the shafts 49, that is, the shafts are at about the center of the teeth, and the ends of the teeth remote from the engaging points thereof carry wheels 51. The shafts 50 which support the wheels are carried by the teeth at the non-engaging ends of the teeth.

These wheels 51 are designed to engage the underfaces of the tracks 43 on the forward runs of the belt, to swing the teeth into operative position. When the wheels move out of engagement with the guide plates, the springs 48 on the pins 49 will swing the forks upward into inoperative position, so that the belts will function as hay conveyors only on the forward runs.

Each pipe 18 is supported near its outer end by a wheel indicated at 52. Each of these wheels is journaled at the lower end of and arm 53 which depends from the adjacent bearing 20.

Referring to Figure 9 it will be seen that the sections of the clip 20 are clamped on the pipe 18 and on the link 19 by means of the bolt and nut 54. The sections of the clamp are pivoted on one side of the pipe 18, embrace the said pipe, and having openings at the other end through which the link 19 extends. The bolt is at the opposite side of the link from the pipe.

In operation, the device is drawn or pushed through the field in any suitable or desired manner, and as the machine moves the movement of the rear axle will drive the shaft 36 which in turn will drive the vertical shafts 29. The belts will be driven, the forward runs of the belts moving inward. As the teeth come onto the forward runs of the belts, the teeth will engage the hay, and the said teeth will be swung into approximately vertical position, the wheels 51 engaging the track ways 43, which will limit the swinging movement of the teeth to an approximately vertical position. On the rear runs of the belts, there is nothing to hold the teeth against the pressure of the hay or of the stubble, and they offer no resistance to the outward movement of the rear runs of the belts.

The springs 48 on the shafts 49 press the teeth toward the belt, and act also to turn the teeth into inoperative position.

I claim:

1. A hay rake comprising a frame consisting of side bars, front, rear and intermediate cross-bars connecting the same, said frame carrying a pair of drive wheels at its rear end, and a single guiding wheel at its front end, raking mechanism supported from said frame and extending laterally from opposite sides thereof intermediate its front and rear ends, said raking mechanism comprising a frame consisting of a central supporting beam and a grooved guide beam disposed in front of the supporting beam, an endless rake-tooth carrying belt driven by a pulley carried at the inner end of the supporting bar, pins projecting laterally from face of the endless belt, and rake teeth mounted to rock on said pins, said rake teeth including forked lower ends, a central hub portion adapted to rock on said pins, and bifurcated upper ends disposed at an angle with respect to the hub and lower end, guide rollers carried at said bifurcated upper ends, adapted to be engaged by the grooved beam to hold the teeth in raking position during inward movement of the belt, a drive shaft disposed centrally between the side bars of the first named frame, and driven from the rear wheels, and universal shaft connections between said drive shaft and the inner endless belt pulleys.

2. A hay rake comprising a frame, said frame comprising drive wheels at its rear end, and steering means at its front end, raking mechanism supported from said frame and extending laterally from opposite sides thereof intermediate its front and rear ends, said raking mechanism comprising a frame including a central supporting beam and a guide beam disposed in front of the supporting beam, an endless rake-tooth carrying belt driven by a pulley carried at the inner end of the supporting beam, rake teeth pivotally mounted on said belt to rock in a vertical plane, each of said teeth having an arm extending beyond the pivot thereof, a guide roller carried at the end of said arm, and adapted to be engaged by the aforesaid guide beam to hold the teeth in raking position during inward movement of the belt, and intermediate gear means between the rear driving wheels and inner belt pulleys.

EVERETT FRANKLIN STANSBERRY.